(12) United States Patent
Li et al.

(10) Patent No.: US 8,154,673 B2
(45) Date of Patent: Apr. 10, 2012

(54) TOUCH PANEL AND DRIVING METHOD THEREOF

(75) Inventors: Jian-Feng Li, Taichung County (TW); Gwo-Sen Lin, Taichung (TW)

(73) Assignee: Wintek Corporation, Taichung (TW)

( * ) Notice: Subject to any disclaimer, the term of this patent is extended or adjusted under 35 U.S.C. 154(b) by 579 days.

(21) Appl. No.: 12/344,196

(22) Filed: Dec. 24, 2008

(65) Prior Publication Data

US 2009/0161060 A1 Jun. 25, 2009

(30) Foreign Application Priority Data

Dec. 25, 2007 (TW) .............................. 96149949 A

(51) Int. Cl.
*G02F 1/1335* (2006.01)
(52) U.S. Cl. ........... 349/12; 349/139; 349/155; 345/173
(58) Field of Classification Search .................... 349/12, 349/155, 139, 158, 199; 345/173, 174; 178/18.01, 178/19.01, 20.01
See application file for complete search history.

(56) References Cited

U.S. PATENT DOCUMENTS 4,707,570 A * 11/1987 Ide et al. ..................... 178/18.05
6,456,279 B1 * 9/2002 Kubo et al. ................... 345/173

* cited by examiner

*Primary Examiner* — Thoi Duong
(74) *Attorney, Agent, or Firm* — Jianq Chyun IP Office

(57) ABSTRACT

A touch panel including a first transparent substrate, a second transparent substrate, first conductive patterns, first electrodes, second conductive patterns, second electrodes, and spacers is provided. The first conductive patterns are disposed on the first transparent substrate, and extend along a first direction. The first electrodes are disposed at the two ends of the first conductive patterns in the first direction. The second conductive patterns are disposed on the second substrate, and extend along a second direction intersecting the first direction. The second electrodes are disposed at the two ends of the second conductive patterns in the second direction. The abovementioned conductive patterns are located between the first substrate and the second substrate, and the projections of the conductive patterns to the first transparent substrate are partially overlapped to form sensing blocks. The spacers are disposed between the first conductive patterns and the second conductive patterns to form a gap.

12 Claims, 4 Drawing Sheets

TOUCH PANEL AND DRIVING METHOD THEREOF

CROSS-REFERENCE TO RELATED APPLICATION

This application claims the priority benefit of Taiwan application serial no. 96149949, filed on Dec. 25, 2007. The entirety of the above-mentioned patent application is hereby incorporated by reference herein and made a part of specification.

BACKGROUND OF THE INVENTION

1. Field of the Invention

The present invention generally relates to a touch panel and driving method thereof, in particular, to a resistive touch panel and driving method thereof.

2. Description of Related Art

At present, the touch panels may be substantially divided into resistive, capacitive, infrared, and ultrasonic touch panels. Among them, the resistive touch panels and the capacitive touch panels are the most common products. For the capacitive touch panels, a multi-touch feature provides a more humanistic operation mode, such that the capacitive touch panels are gradually favoured by the market. However, the capacitive touch panels must be operated by touching the touch panels with a conductive material, and thus users cannot operate it when wearing gloves or with a nonconductive material.

The resistive touch panels can be operated by touching the touch panel with any medium, thus increasing the convenience of using the touch panels. Further, the cost of the resistive touch panels is low, and the technical development thereof is mature, thus gaining a high market share. Generally speaking, the resistive touch panels have two circuit designs and corresponding computation mode, namely analog and digital. The analog resistive touch panels have a high location parsing capability and are applicable to the operation mode of handwriting. The digital resistive touch panels are widely applied in customized commercial products, since sensing blocks with different dimensions can be fabricated according to customer demands. However, the resistive touch panels have no way to carry out the multi-touch limitation, so that the operation mode of the resistive touch panel cannot be more diversified.

SUMMARY OF THE INVENTION

The present invention provides a touch panel, including a first transparent substrate, a plurality of first conductive patterns, a plurality of first electrodes, a second transparent substrate, a plurality of second conductive patterns, a plurality of second electrodes, and a plurality of spacers. The first conductive patterns are disposed on the first transparent substrate, each of the first conductive patterns extends along a first direction, and the first conductive patterns are parallel with each other. The first electrodes are disposed at two ends of the first conductive patterns in the first direction. The second conductive patterns are disposed on the second transparent substrate, each of the second conductive patterns extends along a second direction, and the second conductive patterns are parallel with each other. The first conductive patterns and the second conductive patterns are disposed between the first transparent substrate and the second transparent substrate. The first direction intersects the second direction. The second electrodes are disposed at the two ends of each of the second conductive patterns in the second direction. The spacers are disposed between the first conductive patterns and the second conductive patterns so as to form a gap between the first conductive patterns and the second conductive patterns. The projections of the first conductive patterns and the second conductive patterns to the first transparent substrate are partially overlapped to form a plurality of sensing blocks.

The present invention further provides a driving method adapted for driving the touch panel as described above. The driving method includes utilizing electrical changes between the first electrodes and the second electrodes to generate a digital signal to determine at least one of the sensing blocks. Furthermore, the electrical changes between parts of the first electrodes and the second electrodes connected to the sensing block are utilized to generate an analog signal.

To make the above and other objects, features, and advantages of the present invention more apparent, the embodiments are set forth below in conjunction with accompanying drawings to give a detailed description as follows.

DESCRIPTION OF THE EMBODIMENTS

Figure 1A:
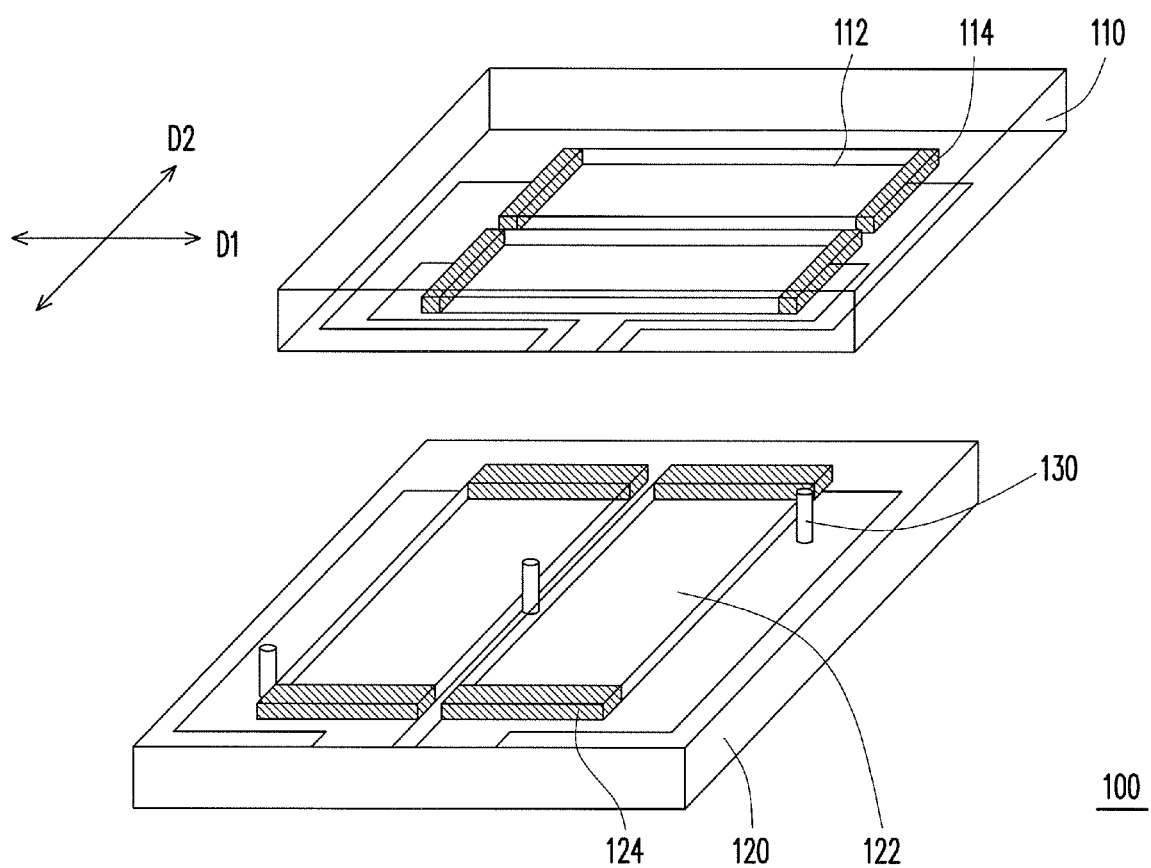
FIG. 1A shows an exploded view of a touch panel according to a first embodiment of the present invention.
Figure 1B:
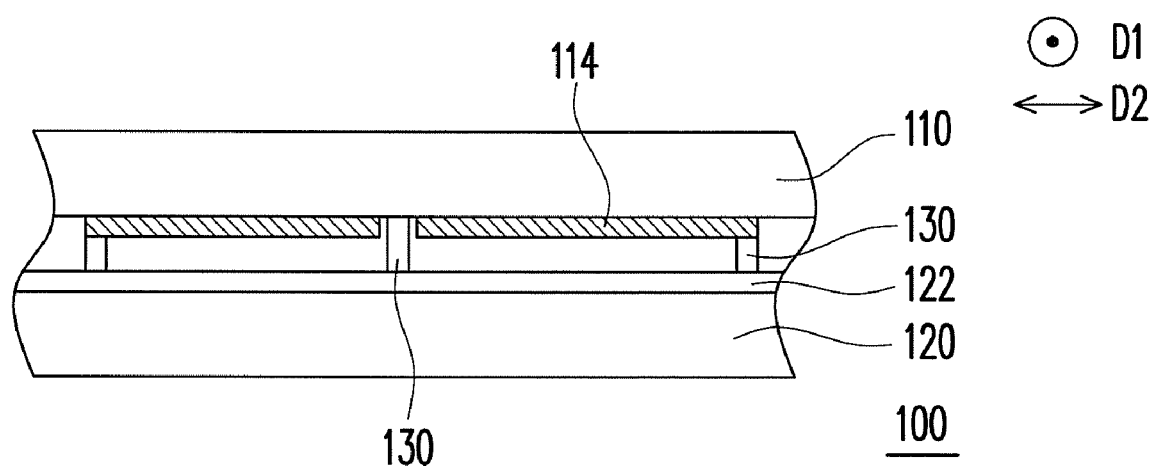
FIG. 1B shows a side view of the touch panel according to the first embodiment of the present invention.

FIG. 1A shows an exploded view of a touch panel according to a first embodiment of the present invention, and FIG. 1B shows a side view of the touch panel of the first embodiment of the present invention. Referring to FIGS. 1A and 1B, the touch panel 100 includes a first transparent substrate 110, a plurality of first conductive patterns 112, a plurality of first electrodes 114, a second transparent substrate 120, a plurality of second conductive patterns 122, a plurality of second electrodes 124, and a plurality of spacers 130. The first conductive patterns 112 are disposed on the first transparent substrate 110. Each of the first conductive patterns 112 extends along a first direction D1, and two adjacent first conductive patterns 112 are parallel with each other. The first electrodes 114 are disposed at the two ends of the first conductive patterns 112 in the first direction D1. The second conductive patterns 122 are disposed on the second transparent substrate 120. The second conductive patterns 122 extend along a second direction D2, and are parallel with each other. The first direction D1 intersects the second direction D2. The second electrodes 124 are disposed at the two ends of the second conductive patterns 122 in the second direction D2. The spacers 130 are disposed between the first conductive patterns 112 and the second conductive patterns 122. The first conductive patterns 112 and the second conductive patterns 122 are substantially located between the first transparent substrate 110 and the second transparent substrate 120.

Furthermore, referring to FIG. 1B, the spacers 130 are disposed between the first conductive patterns 112 and the second conductive patterns 122. A height of each spacer 130 is, for example, larger than a sum of thicknesses of one first conductive pattern 112 and one second conductive pattern 122 so as to form a gap between the first conductive patterns 112 and the second conductive patterns 122. That is to say, when the touch panel 100 is not touched, the first conductive patterns 112 are electrically insulated from the second conductive patterns 122. In practice, the spacers 130 may be disposed on the first conductive patterns 112 and the second conductive patterns 122, and may also be directly disposed on the first transparent substrate 110 and the second transparent substrate 120. In other words, the spacers 130 are disposed so as to maintain the gap between the first conductive patterns 112 and the second conductive patterns 122. The distribution positions and distribution density of the spacers vary according to the requirement of different products. Furthermore, a material of the spacers 130 may be a transparent or an opaque insulating material.

For example, when the spacers 130 are directly disposed on the conductive patterns 112, 122, the spacers 130 may be fabricated by the transparent material. When the spacers 130 are directly disposed on the transparent substrates 110, 120, the spacers 130 may be fabricated by the opaque material. Further, the spacers 130 may be fabricated by a photolithographic process, printing process, scattering process, and so on. In addition to disposing the spacers 130, an optical adhesive may also be filled between the first transparent substrate 110 and the second transparent substrate 120 in the present invention, such that the touch panel 100 can have better transmittance.

Figure 2:
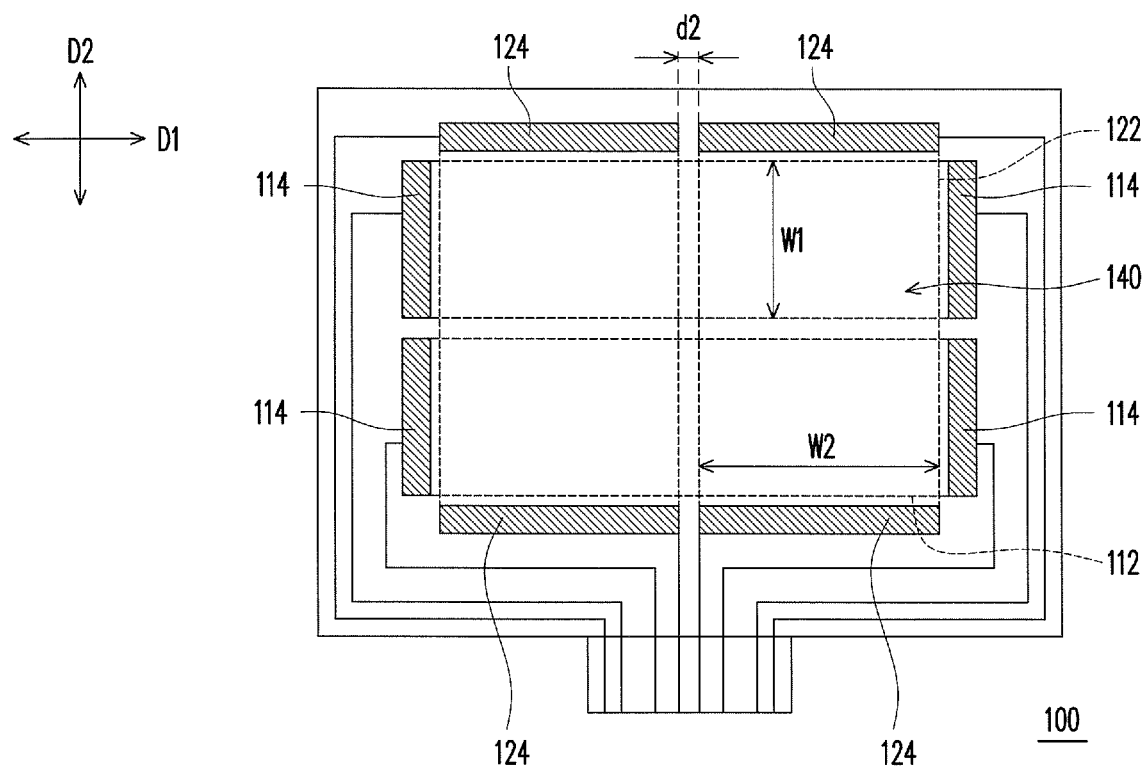
FIG. 2 shows a top view of the touch panel according to the first embodiment of the present invention.

In the present embodiment, the first direction D1 and the second direction D2 are substantially perpendicular to each other. That is to say, the extending directions of the first conductive patterns 112 and the second conductive patterns 122 are perpendicular to each other. Therefore, the projections of the first conductive patterns 112 and the second conductive patterns 122 to the first transparent substrate 110 are partially overlapped. FIG. 2 shows a top view of the touch panel according to the first embodiment of the present invention. Referring to the top view of FIG. 2, the projections of the first conductive patterns 112 and the second conductive patterns 122 to the first transparent substrate 110 are partially overlapped to form a plurality of sensing blocks 140. Since the first electrodes 114 and the second electrodes 124 are respectively disposed at the two ends of the first conductive patterns 112 and the second conductive patterns 122, the sensing blocks 140 constructed by the first conductive patterns 112 and the second conductive patterns 122 are correspondingly connected with two first electrodes 114 and two second electrodes 124 in the first direction D1 and the second direction D2.

The touch panel 100 may use different computation modes to locate the touched position. When the user touches the touch panel 100, the first electrodes 114 and the second electrodes 124 may fully scan so as to detect a current change or a voltage change generated by the touched sensing block 140. At this time, the touch panel 100, for example, utilizes a digital signal to define the touched sensing block 140. When a different sensing block 140 is touched, a corresponding current or voltage change may be generated. Therefore, the touch panel 100 can simultaneously sense digital signals of a plurality of sensing blocks 140 through the digital signals. That is, the touch panel 100 includes a multi-touch function. In the present embodiment, the overlapped portions of the first electrode patterns 112 and the second electrode patterns 122 constitutes four sensing blocks 140, and thus the touch panel 100 may simultaneously sense four blocks 140 at most. Certainly, if the number of the sensing blocks 140 increases, the touch panel 100 may simultaneously sense more points.

Generally speaking, if the user touches the touch panel 100 with a stylus or other tools, only a single position is touched, i.e., a single-touch is performed. When the user operates the touch panel 100 with a finger, it is more possible to simultaneously touch different positions to perform a multi-touch. Therefore, if the touch panel 100 is designed with taking a finger width into account, a width W1 of the first conductive patterns 112 perpendicular to the first direction D1 is, for example, 0.2 cm to 2 cm, and a width W2 of the second conductive patterns 122 perpendicular to the second direction D2 may also be, for example, 0.2 cm to 2 cm. That is, each sensing block 140 may substantially be properly sized in conformity with the finger width. As such, the widths of the first conductive patterns 112 and the second conductive patterns 122 are not limited to be micro dimension, thus facilitating the increase of the process yield.

Besides, each sensing block 140 is correspondingly connected with two first electrodes 114 and second electrodes 124 in the first direction D1 and the second direction D2. Therefore, the touch panel 100 of the present embodiment may perform a location computation of analog signal for each sensing block 140. That is, when the touch panel 100 is touched to generate an electrical change, a certain sensing block 140 or some sensing blocks 140 touched may be defined. At the same time, an analog signal scanning may be further performed in the sensing block 140 or sensing blocks 140 to more preciously locate the touched positions. On the whole, except the above multi-touch function, the touch panel 100 further includes an analog computation mode with a high resolution, which is applicable to the operation mode of handwriting.

In specific, the touch panel 100 further includes at least one driver chip (not shown) to perform the abovementioned digital signal and analog signal computation. In short, the operating method of the touch panel 100 of the embodiment is described as follows. First, the driver chip (not shown) is utilized to detect a digital signal generated between the first electrodes 112 and the second electrodes 122, and determine at least a touched sensing block 140. Then, the driver chip (not shown) may further utilize an analog signal generated in this touched sensing block 140 to perform a more precise location computation. The abovementioned digital signal and analog signal are used to obtain the instruction to be input by the user, so as to achieve the operation of the product.

Furthermore, when the number of the driver chip (not shown) is one, the touch panel 100 may further include a multiplexer (not shown) connecting the driver chip, such that the driver chip (not shown) may perform a scanning and computation of the digital signal and analog signal in sequence. That is, the touch panel of the present invention may achieve a multi-touch and an operation function with a high resolution without disposing a plurality of driver chips (not shown).

In an embodiment, if the user wants to draw or write through the stylus, the driver chip may preferably sense the entire track touched by the stylus. When the gap between the first conductive patterns 112 or between the second conductive patterns 122 is too large, the move track of the stylus between different sensing blocks 140 may not be detected continuously. Therefore, a distance d1 between any two adjacent first conductive patterns 112 is, for example, 1 μm to 1000 μm, and a distance d2 between any two adjacent second conductive patterns 122 may also be 1 μm to 1000 μm. That is, a proper distance must be maintained between any two adjacent conductive patterns 112, 122 to maintain the resolution of the touch panel 100.

In practice, the spacers 130 may separate the first conductive patterns 112 from the second conductive patterns 122, and a height of the spacers 130 is, for example, 2 μm to 200 μm, a preferred height is, for example, 3 μm to 10 μm. When the touch panel 100 is not touched, the spacers 130 may maintain an electrical insulation between the two conductive patterns 112, 122. The material for the spacers 130 includes glass, plastic, high molecular material, oxide material, or a combination of the above. Further, the touch panel 100 is mostly adhered on the liquid crystal display panel to achieve a convenient operation. Therefore, a common material of the first transparent substrate 110 and the second transparent substrate 120 includes glass, acryl, polyimide, polyethyleneterephthalate (PET), polycarbonate(PC), or a combination therefore. Additionally, a material of the first conductive patterns 112 and the second conductive patterns 122 may also be a transparent conductive material, which is one selected from a group consisting of indium-tin oxide (ITO), cadmium-tin oxide (CTO), aluminium-zinc oxide (AZO), indium-zinc oxide (IZO), zinc oxide (ZnO), tin oxide (SnO) or conductive polymer. The material of the first electrodes 114 and the second electrodes 124 is, for example, silver, chromium, Aluminium, or metal paste.

Figure 3:
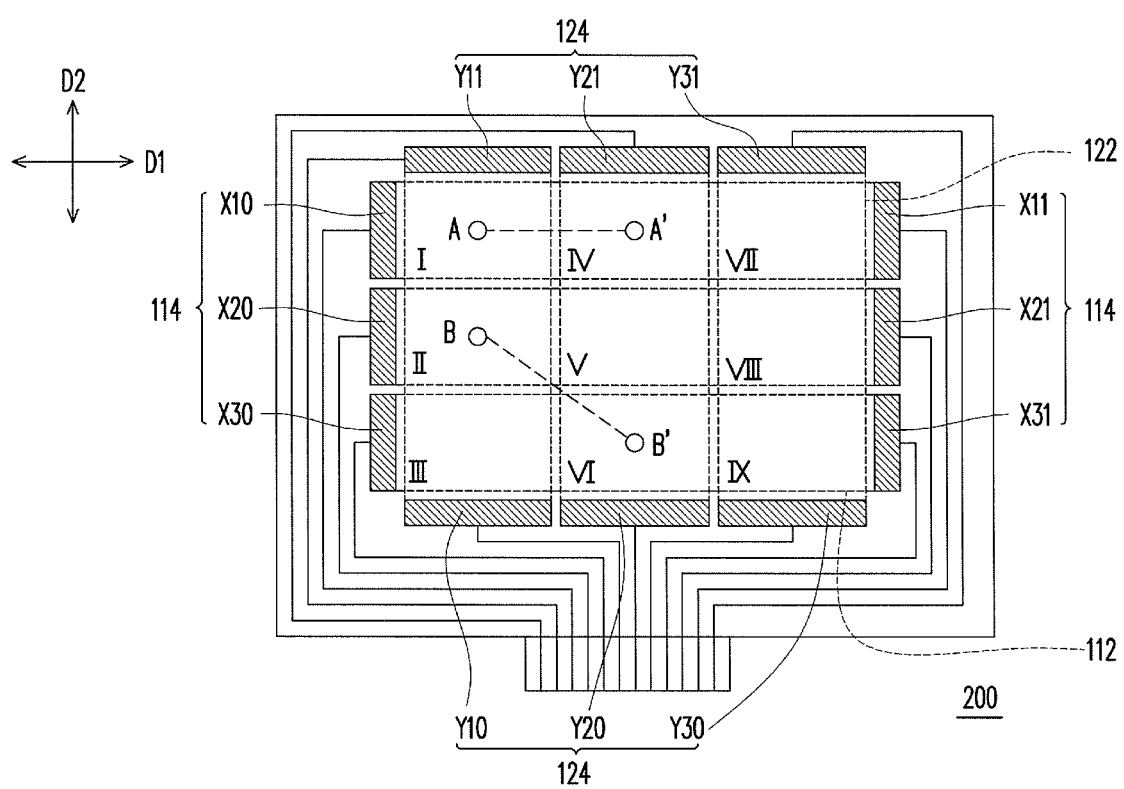
FIG. 3 shows a top view of a touch panel according to a second embodiment of the present invention.

FIG. 3 shows a top view of a touch panel according to a second embodiment of the present invention. Referring to FIG. 3, the touch panel 200 is substantially similar to the touch panel 100 of the first embodiment. The touch panel 200 includes three first conductive patterns 112 and three second conductive patterns 122. Further, in the touch panel 200, the first electrodes 114 and the second electrodes 124 are respectively disposed at the two ends of the first conductive patterns 112 and the second conductive patterns 122. The overlapped regions of first conductive patterns 112 and the second conductive patterns 122, for example, define nine sensing blocks I-IX.

In detail, the first electrodes 114 include first electrodes X10-X30 at one end of the first conductive patterns 112, and first electrodes X11-X31 at the other end. The second electrodes 124 includes second electrodes Y10-Y30 and second electrodes Y11-Y31 at the two ends of the second conductive patterns 122. A width of the first conductive patterns 112 perpendicular to the first direction D1 is, for example, more than 0.2 cm but less than 2 cm, and a width of the second conductive patterns 122 perpendicular to the second direction D2 may also be, for example, 0.2 cm to 2 cm. As such, an area of each sensing blocks I-IX is about 0.04 cm2 to 4 cm2. The distance between any two adjacent first conductive patterns 112 is, for example, 1 μm to 1000 μm, and the distance between any two adjacent second conductive patterns 122 may also be 1 μm to 1000 μm.

Base on the embodiments of the invention, there are three different driving methods to sense and define the coordinates that is touched by a user. From the perspective of digital driving method, it utilizes electrical changes between the first electrodes 122 and the second electrodes 124 to generate a digital signal so as to determine which sensing block is touched by the user. For example, when the user touches the touch panel 200 with fingers, at least one driver chip (not shown) may generates multiple digital signals and sequentially input the digital signals to each of the first conductive patterns 112 for scanning purpose. Next, the second conductive patterns 122 detect at least one of the digital signals and transfer the digital signal to the driver chip for defining at least a sensing block, such as position A shown in FIG. 3.

Moreover, when the user touches a position A and a position B of the touch panel 200 with fingers at the same time, the second conductive pattern 122 between the second electrodes Y10 and Y11 detects two digital signals that are sequentially inputted to the first conductive pattern 112 located between the first electrodes X10 and X11 and the first conductive pattern 112 located between the first electrodes X20 and X21.

Subsequently, the digital signals are transferred to the driver chip for computation and defining two sensing blocks, which are the sensing block I and the sensing block II. As a result, the sensing block I and the sensing block II represent the position A and position B.

From the perspective of analog driving method, it utilizes electrical changes between parts of the first electrodes 122 and the second electrodes 124 connected to the sensing blocks to generate an analog signal for determining at least one corresponding coordinate. For example, when the user touches the position A in sensing block I of the touch panel 200 with fingers, the driver chip inputs two different voltages to the first electrodes 114 (X10, X11). Therefore, the first electrode X10 receives a high voltage, such as 5V, and the other first electrode X11 receives a low voltage, such as 0V, to form a first voltage difference. Next, at least one of the second electrodes 124 (Y10, Y11) detects one or more than one first sensing voltage signals and transfers the first sensing voltage signal to the driver chip for defining a coordinate in the first direction. The coordinate in the first direction may be one set of numbers so far. Next, the driver chip generates and inputs another two different voltages to the second electrodes 124 (Y10, Y11), for example, the second electrode Y10 receives a high voltage, such as 5V, and the other second electrode Y11 receives a low voltage, such as 0V, to form a second voltage difference. Next, at least one of the first electrodes 114 (X10, X11) detects one or more than one second sensing voltage signals and transfers the second sensing voltage signal to the driver chip for defining a coordinate in the second direction. The coordinate in the second direction may be another set of numbers so far. Finally, a precise coordinate is produced according to the coordinate in the first direction and the coordinate in the second direction. In addition, all of the positions A', B, B' as shown in FIG. 3 can be detected by the same driving method in the other eight sensing block II-VIII. One important features of the invention is that several positions can be detected at the same time according to the driving method mentioned above.

Moreover, the analog driving method further includes other steps such as detecting a divided voltage as the first sensing voltage signal by the second electrodes 124 according to the first voltage difference, forming the second voltage difference according to another two different voltages inputted to the first electrodes arranged at two sides of each second conductive pattern, and detecting another divided voltage as the second sensing voltage signal by the first electrodes according to the second voltage difference.

Furthermore, the second electrodes (Y10-Y11, Y11-Y31) can detect several sensing voltage signals at the same time when the first conduct patterns 112 are sequentially inputted different voltages through the first electrodes (X10, X11), (X20,X21), (X30,X31). For example, (X10, X11)=(5V, 0V), (X20,X21)=(5V, 0V), (X30,X31)=(5V, 0V). Besides, the first electrodes (X10-X11, X11-X31) can detect several sensing voltage signals at the same time by the same driving method. Therefore, the position A and position B can be detected at time period and the position A' and position B' can be detected at time period II to show a movement from A to A' and the other movement form B to B'.

There is still a third driving method that combines the digital driving method and the analog driving method aforementioned. For example, when the position A and position B are touched by the user, the digital driving method aforementioned is executed first to define sensing block I and sensing block II, which are both already touched. Next, the analog driving method aforementioned is executed to define precise coordinate (position A) in sensing block I and define the other precise coordinate (position B) in sensing block II.

In other words, from the perspective of third driving method, when the first electrode X10 is provided with a high voltage, and the other first electrode X11 is grounded to form a voltage difference. Then, a coordinate in the first direction D1 is defined by a sensing voltage signal in the second electrodes Y11, Y10. Thereafter, different voltages are input to the second electrodes Y11, Y10. For example, the second electrode Y11 is provided with a high voltage, and the other second electrode Y10 is grounded. A coordinate in the second direction D2 is defined by a voltage signal detected in the first electrodes X10, X11. The position A can be precisely defined by the coordinates of the first direction D1 and the second direction D2. In the same way, the position B in the sensing block II may also be defined through the abovementioned steps.

If the user's finger is gradually moving from the position A to a position A' on the touch panel 200, a digital signal will be generated in the sensing block IV, and the scanning of the analog signal is migrated onto the sensing block IV. That is, when the finger moves from the position A to the position A', the driver chip can decide whether or not to perform a scanning and detection of analog signal on the sensing block I or the sensing block IV according to the digital signal. Therefore, the move track of the finger in different sensing blocks I-IX can be precisely located. Certainly, when another finger of the user moves from the position B to a position B', the driver chip may also perform an analog signal scanning on the sensing block II and the sensing block VI successively to precisely define a track input by the user. In other words, the touch panel 200 includes a multi-touch function, and may precisely define the track input by the user when operates, so as to provide a writing function with a high resolution.

In view of the above, the present invention has electrodes disposed at both sides of the conductive patterns of the touch panel. Therefore, the touch panel can sense the region of the touched sensing block through digital computation. Furthermore, the touch panel of the present invention may also perform an analog computation on the touched sensing block to enhance the location parsing capability of the touch panel. Further, the touch panel of the present invention can simultaneously sense different sensing blocks, and has a multi-touch function, and the touch panel of the present invention includes a high position resolving capability and thus can be applied to the mode of handwriting inputting. In short, the touch panel of the present invention is integrated with the multi-touch and multi-functions adapted for handwriting, such that the operation of the touch panel is more humanistic and convenient.

The present invention is disclosed in the above embodiments, but is not to limited to those. Therefore, those ordinary skilled in the art can make alterations and modifications without departing from the spirit and scope of the present invention, and thus the protective scope of the present invention would be defined by the accompanying claims.

What is claimed is:

1. A touch panel, comprising:
    a first substrate;
    a plurality of first conductive patterns, disposed in parallel on the first substrate and each extending along a first direction;
    a plurality of first electrodes, disposed at two ends of each of the first conductive patterns in the first direction;
    a second substrate, oppositely disposed at a side of the first transparent substrate;
    a plurality of second conductive patterns, disposed in parallel on the second substrate and each of the second conductive patterns extending along a second direction intersecting the first direction, wherein the first conductive patterns and the second conductive patterns are located between the first substrate and the transparent substrate;
    a plurality of second electrodes, disposed at two ends of each of the second conductive patterns in the second direction; and
    a plurality of spacers, disposed between the first conductive patterns and the second conductive patterns, so as to form a gap between the first conductive patterns and the second conductive patterns;
    wherein projections of the first conductive patterns and the second conductive patterns to the first substrates are partially overlapped to form a plurality of sensing blocks.

2. The touch panel according to claim 1, wherein the first direction and the second direction are substantially perpendicular to each other.

3. The touch panel according to claim 1, wherein a width of the first conductive patterns perpendicular to the first direction is substantially 0.2 cm to 2 cm and a width of the second conductive patterns perpendicular to the second direction is substantially 0.2 to 2 cm.

4. The touch panel according to claim 1, wherein a distance between any two adjacent first conductive patterns is substantially 1 μm to 1000 μm and a distance between any two adjacent second conductive patterns is substantially 1 μm to 1000 μm.

5. The touch panel according to claim 1, wherein an area of each of the sensing blocks is 0.04 $cm^2$ to 4 $cm^2$.

6. The touch panel according to claim 1, wherein a material of the spacers comprises glass, plastic, high molecular material, oxide material, or a combination of the above.

7. The touch panel according to claim 1, wherein a material of the first transparent substrate and the second transparent substrate comprises glass, acryl, polyimide, polyethyleneterephthalate, polycarbonate, or a combination of the above.

8. The touch panel according to claim 1, wherein a material of the first conductive patterns and the second conductive patterns is one selected from a group consisting of indium-tin oxide (ITO), cadmium-tin oxide (CTO), aluminium-zinc oxide (AZO), indium-zinc oxide (IZO), zinc oxide, tin oxide or conductive polymer.

9. The touch panel according to claim 1, wherein a height of the spacers is 2 μm to 200 μm.

10. The touch panel according to claim 1, wherein a material of the first electrodes and the second electrodes comprises silver paste.

11. A driving method, adapted for driving the touch panel according to claim 1 and the touch panel having at least a driver chip connecting the first electrodes and the second electrodes, the driving method comprising:
    generating a plurality of digital signals by the driver chip;
    sequentially inputting the digital signals to each of the first conductive patterns for scanning purpose;
    detecting at least one of the digital signals by the second conductive patterns and transferring the digital signal to the driver chip for defining at least one sensing block;
    inputting two different voltages by the driver chip to the first electrodes arranged at two sides of the first conductive pattern corresponding to the sensing block;

detecting at least a first sensing voltage signal by the second electrodes and transferring the first sensing voltage signal to the driver chip for defining a coordinate in the first direction;
inputting another two different voltages by the driver chip to the second electrodes arranged at two sides of each second conductive pattern corresponding to the sensing block;
detecting at least a second sensing voltage signal by the first electrodes and transferring the second sensing voltage signal to the driver chip for defining a coordinate in the second direction; and
outputting a precise corresponding coordinate according to the coordinate in the first direction and the coordinate in the second direction.

12. The driving method according to claim 11, comprising:
detecting at least two first sensing voltage signals by the second electrodes and transferring the first sensing voltage signals to the driver chip for defining a plurality of coordinates in the first direction;
detecting at least two second sensing voltage signals by the first electrodes and transferring the second sensing voltage signals to the driver chip for defining a plurality of coordinates in the second direction; and
outputting a plurality of corresponding coordinates according to the coordinates in the first direction and the coordinates in the second direction.

* * * * *